3,348,141
TIME INTERVAL MEASUREMENT UTILIZING A TUNNEL DIODE SWITCHED BY REFLECTED PULSES FROM TRANSMISSION LINES
Hartley J. Jensen, Davis, and Elmer E. Smith, Livermore, Calif., assignors to the United States of America as represented by the United States Atomic Energy Commission
Filed May 6, 1966, Ser. No. 548,330
9 Claims. (Cl. 324—68)

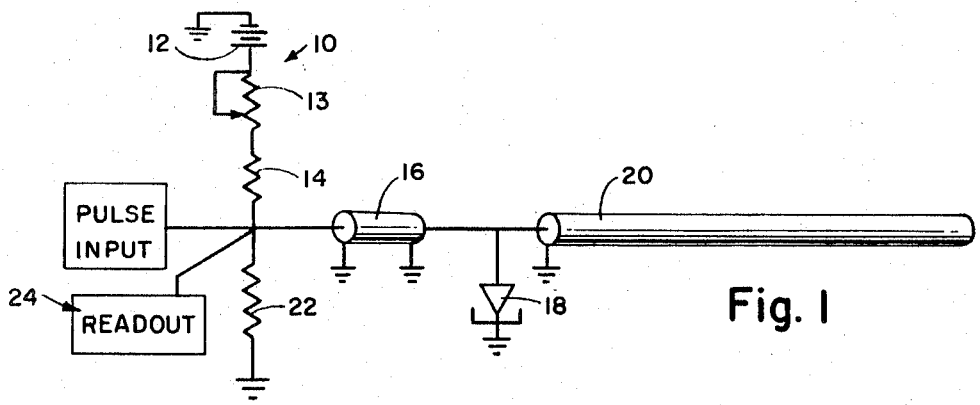
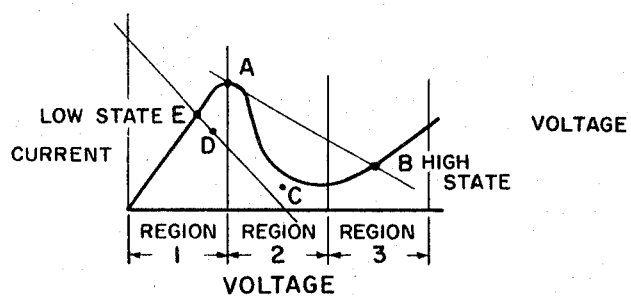
Fig. 2
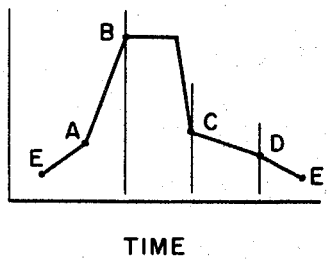
Fig. 3
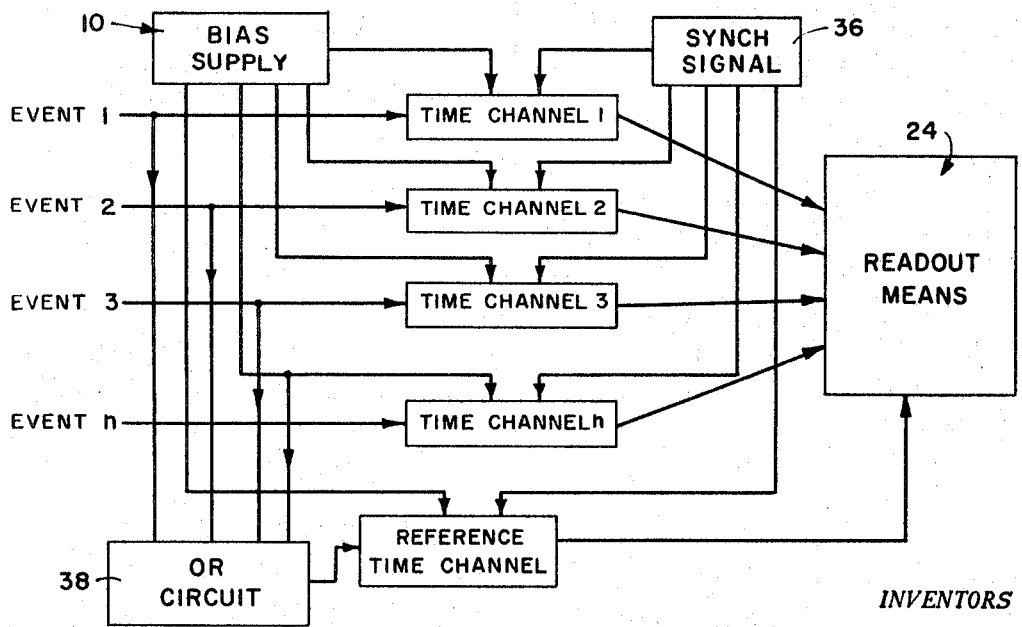
Fig. 4
INVENTORS
Hartley J. Jensen
Elmer E. Smith Hartley J. Jensen
Elmer E. Smith
INVENTORS United States Patent Office 3,348,141
Patented Oct. 17, 1967

ABSTRACT OF THE DISCLOSURE

An electronic apparatus for measuring intervals of about one to several thousand nanoseconds comprising one or more pulse generating circuits including a tunnel diode which is switched between high and low voltage states by reflected pulses from electrical transmission lines of unequal length, means for multichannel coupling of several pulse generating circuits, a bias source means which facilitates switching of the tunnel diode, an initiating pulse input means including one or more electrical transmission lines for delaying one or more input pulses, and a readout means such as a conventional flip-flop and a calibrated output averaging meter electrically connected thereto.

This invention relates to the measurement of time intervals between events. More specifically, this invention relates to the measurement of time intervals on the order of a nanosecond or more between successive events.

There has been a need for apparatus capable of ascertaining time intervals in the nanosecond range which are more compact, more reliable, electronically simpler, and less costly than prior art devices. The device herein described and claimed fulfills the criteria set forth and thus is not subject to the limitations of the prior art. Devices heretofore capable of nanosecond time resolution with two-channel capacity have generally not been adaptable to multi-channel operation because of size and cost limitations. The present invention has multi-channel capability, is compact, and is far less costly per channel than devices heretofore known.

The circuit theory upon which this invention is based primarily utilizes the changing operating point characteristics of tunnel diodes and the pulse reflecting characteristics of transmission lines with either an open termination or a lower impedance termination. A tunnel diode, biased to a certain point on a load line, may, upon receiving a positive voltage pulse, switch along its load line from a stable region, through an unstable region, to a second point in a second stable region. The diode, as it switches, generates a voltage pulse which may travel down an electrically short transmission line and an electrically long transmission line. The pulse that travels down the long transmission line may be referred to as the primary pulse and the pulse that travels down the short transmission line may be referred to as the secondary pulse. If the secondary pulse reflects back along the short transmission line as a negative pulse, or opposite in polarity to that pulse which was originated at the diode, the tunnel diode may be switched back to its original operating point. The primary pulse, reflected from an electrically long transmission line, may return as a positive pulse and switch the tunnel diode back along its load line again into its other or second stable state and may generate another pulse. The pulses thus generated may travel down and be reflected back along the short and long transmission lines to repeat the process almost indefinitely.

The time interval between positive pulses may be determined using appropriately calibrated readout means, such as a tunnel diode flip-flop circuit and a calibrated ammeter or an integrating digital volt-meter in conjunction therewith. As a result of the recurring positive pulses generated by the tunnel diode in response to the initial input pulse, the tunnel diode flip-flop is switched to and from a high and a low conductive state and its average output may be read on an ammeter which may be suitably calibrated such that a reading may be translated into time intervals. If another positive input pulse, displaced from the first in time, is impressed on the circuit, it may be understood that the above described phenomenon takes place with respect to that pulse also. The time interval between pulses may then be determined by calibrated readout means, using the flip-flop circuit and means discussed above or any other appropriate readout means which may determine the average output of the flip-flop and correspondingly, the relative time difference between the two pulses recirculating within the long transmission line.

It is an object of this invention to provide means for measuring the interval between events displaced in time.

It is another object of this invention to provide means for measuring time intervals which utilizes the electronic switching characteristics of tunnel diodes.

It is another object of this invention to provide time interval measuring means having a time resolution on the order of about a nanosecond.

This specification, including the description, drawing, and claims, has been prepared in accordance with the applicable patent laws and the rules promulgated under the authority thereof.

FIG. 1 schematically shows the basic circuit;

FIG. 2 shows a typical tunnel diode characteristic curve with load lines and operating points superimposed;

FIG. 3 discloses a typical tunnel diode waveform;

FIG. 4 schematically illustrates a multiple channel circuit;

FIG. 5 schematically illustrates a basic two-channel time interval measurement circuit;

Figure 5:
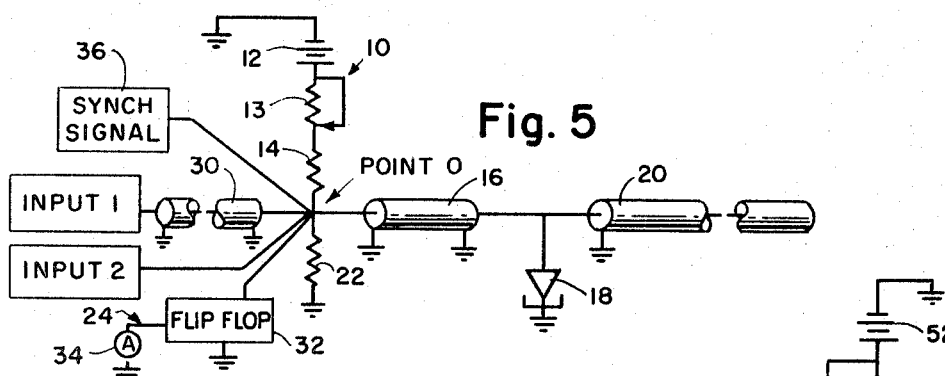

FIG. 1 discloses biasing means 10 for tunnel diode 18 which may comprise power supply 12, variable resistor 13 and fixed resistor 14. While it may be necessary to use only a variable resistor, a combination of fixed and variable resistors may provide for greater biasing accuracy. An electrically short transmission line 16 and an electrically long transmission line 20 may be connected to the tunnel diode 18. Resistor 22, input means, and readout means 24 may complete the circuit. An input signal or pulse arriving at tunnel diode 18 from the input means may switch the diode to its high state and may generate a pulse. The pulse thus formed may travel down short transmission or delay line 16 and down long transmission or delay line 20. The wave front traveling down the short transmission line may reflect negatively from resistor 22 at the end of transmission line 16 and may switch diode 18 back to its low state. The pulse traveling down long transmission line 20 may reflect from the open termination as a positive pulse. This reflected pulse may cause diode 18 to switch again to its high state and hence begin another pulse repetition. Thus the sequence may continue virtually indefinitely. Since the initial transient pulse may be turned into a recurring pulse, the input pulse may be considered as "stored" in the basic circuit, with a time period equal to twice the electrical length of the long transmission line.

The electrical length of the long transmission line may determine the period or measuring range of the circuit. For example, a transmission line 65 feet long with 50 ohm impedance may have an electrical length of 100 nanoseconds, and an effective length of twice the electrical length, or 200 nanoseconds. The effective length is the time required for a pulse to traverse the line, reflect from the open end, and return along the line to the diode, or originating point.

Circuit parameters may be determined from an analysis of the specific tunnel diode and the transmission line used, which in turn may be selected according to the time periods desired. For example, the maximum period obtainable may be limited by the attenuation of the reflected pulse. For periods of 500 nanoseconds or less, transmission cable such as RG–174, which has an impedance of 50 ohms may be satisfactory. If longer periods are desired, a cable with minimum loss at high frequencies should be used. By using RG–213 cable, for example, the range may be extended to about 6 microseconds.

The electronic switching characteristics of tunnel diodes responsible for the above described phenomena may be briefly explained by referring to FIGS. 2 and 3. FIG. 2 discloses a typical tunnel diode characteristic curve with load lines and operating points superimposed. A tunnel diode 18, such as IN3859, may be biased by power supply 12 through resistors 13 and 14 to point E, which may have a value of about 80 millivolts. Point E, the static operating point, or low state, of the diode, is preferably selected in a manner such that the static load line constructed through the point intersects the characteristic curve at only one location. The value of resistors 13 and 14 is thus selected to provide, with the power supply, the desired operating point on the characteristic curve. The value of the resistance is determined by finding the quotient of the voltage and current of the static load line where it crosses the ordinate and the abscissa. The impedance under consideration is composed of resistor 22 in parallel with the transmission line 16, which may have an impedance of 50 ohms. In the circuit illustrated, experience has shown that a value of 8 to 10 ohms for resistor 22 may provide more reliable circuit operation than the calculated value of the resistor which is about 12.5 ohms. This phenomenon may be due to variables in the diode and in the circuitry.

The dynamic load line comprises the parallel impedance of the two transmission lines. Hence, with 50 ohm transmission lines the dynamic load may be about 25 ohms.

If an input or voltage pulse of sufficient magnitude is applied at the junction of diode 18 and transmission lines 16 and 20, the operating point of the diode may move from point E in stable region 1 to point A of FIG. 2. Point A is in the negative resistance or unstable region of the diode, indicated as region 2, and the operating point will tend to move along the dynamic load line to point B, which is in region 3, a stable region, thus creating a voltage step. The operating point may then remain at B while the voltage wave-front travels from the diode, along short transmission line 16 to resistor 22 and back to the diode. Since the value of resistor 22 is lower than the impedance of transmission line 16, the reflected pulse on line 16 may be of opposite polarity to that generated at the diode. This negative pulse may, upon its arrival at the diode, switch the diode and thus force the operating point to move to some point C, which is again in the negative resistance region. The operating point may continue to move toward the static load line at some point D, and from D it may move along the static load line to the initial operating point E.

The voltage wave form generated on the diode is shown in FIG. 3, where voltage is plotted against time. From point A to point B corresponds to the switching of the diode and thus may follow the rise time of the diode. The times B to C and C to D should be equal since the reflected pulse (C to D) should be equal in length to the original pulse (B to C). The path D to E coincides with the relaxation of the diode along its static load line.

The tunnel diode characteristics thus discussed, as illustrated in FIGS. 2 and 3, may be utilized in the circuits shown in FIGS. 1, 4, 5, 6, and 7. The embodiment shown in FIG. 4 makes use of the fundamental circuit shown in FIG. 1, and the embodiment shown in FIG. 7 makes use of the basic circuit shown in FIG. 5, which in turn is based on the fundamental circuit of FIG. 1.

The above described circuit and operating characteristics may be utilized for measuring time intervals in the nanosecond and microsecond range. FIG. 4 discloses a multi-channel apparatus utilizing the principles hereinabove set forth. Input channels have been numbered using "event" as a prefix. It may be readily understood that the device may use as an input pulse any information or events capable of being transduced to voltage pulses. Thus a pressure transducer, light transducer, sound transducer, or any combination of transducers, or any other appropriate input means may provide the desired input pulses. Moreover, the number of channels, and thus discrete events, which may be utilized is virtually unlimited, or limited only by practical considerations of size, cost, etc.

In FIG. 4 each time channel may comprise essentially the circuit disclosed in FIG. 1. While the power supply, variable and fixed resistors which comprise the biasing means 10 for the tunnel diodes in the respective channels has been shown as a single "black box," it may be understood that due to individual circuit and diode characteristics each channel circuit may require a different bias supply to standardize the operating point (E of FIG. 2) of each diode 18.

Individual circuit variations may also require means to synchronize the various pulses with respect to each other. Synchronization signal means 36 are shown feeding into each channel circuit. Although the long transmission lines 20 may be cut to nearly the desired electrical lengths, small differences in periods between channels may cause the recurring pulses stored in the circuit to drift in time with respect to each other. This drift may be prevented by superimposing a synchronizing signal on the bias voltage. The synchronizing signal may, for example, be on the order of a 500 megacycle sine wave, thus allowing the pulses to drift only one nanosecond in either direction before locking onto a peak of the synchronizing signal.

Input signals or pulses may go to both an OR circuit 38 and to respective timing channels where the above described recurring pulses are generated. The first pulse to the OR circuit may start a reference time channel and the remaining pulses are then blocked by the OR gate. The reference time may be used for comparative purposes by the readout means 24. The readout means, which may comprise a dual channel digital readout oscilloscope, may compare individually selected channels against the reference channel and may present the information in digital information or in oscilloscope traces.

FIG. 5 discloses a two channel circuit utilizing the basic circuit disclosed above. The input means may include provision for two input pulses, each of which may initiate a recurring pulse at tunnel diode 18 by switching the diode as heretofore discussed. Input channel 1 may include a delay line 30 of known electrical length. By thus knowing the length of time required for a pulse to traverse line 30, the readout means 24, which may comprise a tunnel diode flip-flop 32 of conventional design and a microammeter 34, may be calibrated to show the time interval between the input pulses.

If input 1 and input 2 are simultaneous, input 2 will trigger diode 18 before input 1 because input 1 is delayed, causing a pulse which may enter tunnel diode flip-flop 32, and which may enter short transmission line 16 and long transmission line 20. Point O of FIG. 5 may comprise a five port mismatch junction. If the five lines (bias, inputs, and output) each provide fifty ohm terminations in parallel, then the impedance at point O, from the tunnel diode, will be equivalent to ten ohms. Thus a pulse after traversing short transmission line 16, may arrive at point O and may see an equivalent impedance less than that of line 16 and may therefore reflect back reversed in polarity, or negative. The negatively reflected pulse may in turn switch diode 18 from its high state to its low state, and a positive pulse, reflected from the open end of long tranmission line 20, may switch the diode from a low state to a high state and may initiate another positive pulse, which in turn follows the sequence outlined. As the diode switches from its low state to its high state and the positive pulse thus generated tranverses line 16 to point O, the flip-flop 32 switches and its output varies accordingly. Input 1 may enter delay line 30, which may be electrically equal to long transmission or delay line 20, or equal to one-half the effective length of long transmission or delay line 20. That is, the electrical lengths of 20 and 30 may be equal, but the effective length of the long transmission or delay line 20 is twice its electrical length because the pulse is reflected back. After input pulse 1 has traversed delay line 30 it will trigger diode 18 and the voltage pulse initiated may follow the same sequence as that of input pulse 2. If the delay 30 is electrically equal to one-half the effective length of delay 20, input 1 may be presented at diode 18 just as input pulse 2 has traversed the length of delay 20 and is reflected back. Thus the diode 18 is switched to its high state at equal periods of time and consequently the tunnel diode flip-flop 32, which may be triggered by the output pulse from diode 18, may be "on" and "off," or in a high conducting state and low conducting state, for equal periods of time. This phenomenon may be average and presented by calibrated readout means 34, which may be a microammeter or an integrating digital volt-meter. Such a condition as above described may therefore present a balanced meter reading, which according to the calibration of the meter 34, would indicate the simultaneity of input pulses 1 and 2.

If the pulses lack simultaneity the diode 18 is switched to its high state as unequal periods of time. Consequently, flip-flop 32 will be on longer than it is off, or off longer than it is on, depending on the sequence and time interval. The readout presented on calibrated meter 34 will indicate the situation by an appropriate average output reading, which may be converted to the correct time interval according to the calibration thereof. For example, if input 1 arrives before input 2, but not earlier than a time equal to the range of the circuit, which is the electrical length of the long transmission line (and also the electrical length of the delay line 30), input 2 will still trigger the diode first. However, the periods of the stored pulses will now appear to be unbalanced. The flip-flop may be in a high state for a time period less than it may be in a low state, and its output may be of a less positive nature and the meter reading will indicate the magnitude of the positive output. If input 2 arrives prior to input 1, the opposite situation may occur. That is, the flip-flop may be in a high state longer than it may be in a low state, and this may in turn result in a higher average output, which may be read on the meter and may be converted to a time interval measurement.

Figure 6:
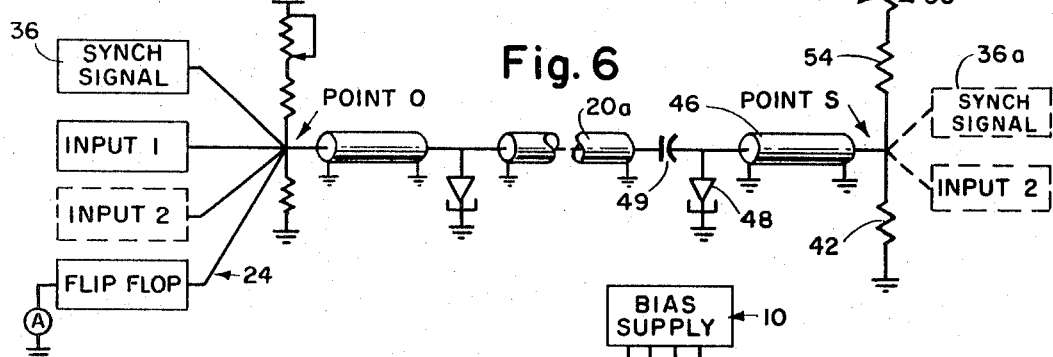
FIG. 6 illustrates a pulse regeneration circuit.

If it is desired to increase the time period of a circuit, by varying the length of the long delay line, it may be desirable to include means for regenerating the positive pulse at the end of the long transmission line. This may be accomplished as shown in FIG. 6. At the end of long transmission line 20a another tunnel diode 48, bias supply 50, which may comprise power supply 52 and resistors 53 and 54, and short transmission line 46 and resistor 42 may be added. A positive pulse may be somewhat attenuated as it traverses long delay line 20a, and in order to increase the strength of the pulse for its return trip, the pulse may be used to trigger a tunnel diode 48, which may be similar to diode 18, and may cause a new pulse to be generated. The action of the new pulse may be similar to that of the pulses originating at diode 18. That is, the pulse may be reflected negatively from point S and the negative wave front may switch the diode to its low state, thus making it ready for a repetitive pulse from diode 18. Capacitor 49, between long transmission line 20a and tunnel diode 48, may isolate the bias supplies. The added circuitry may therefore function to regenerate an attenuated pulse and may therefore aid in increasing the time interval capable of being measured by the circuit. It may be readily seen that the regenerative circuit may be added to the circuit of FIG. 1 as well as to the circuit of FIG. 5.

It may be desirable to have input channels on opposite ends of the circuit. This may be accomplished by transferring input channel 2 from point O to point S of FIG. 6 as shown in phantom. Under such circumstances diode 48 becomes the originating point for the pulse from the second channel. The circuit would, in most respects, function substantially the same as hereinbefore described. If it is desired to impress an input at point S, a delay line 30 may be dispensed with because the long transmission line 20a would act as an initial delay line to the pulse originating at point S as long as readout means 24 remains at point O.

Circuit experiments have indicated that it may be desirable to superimpose a synchronization signal or controlled oscillation on the DC bias to lock in the stored pulses with respect to each other. As in the case of the multi-channel embodiment of FIG. 4, circuit variations such as nodes, oscillations, etc., of an unknown manner and inherent in the circuit, may cause the pulses to shift in time displacement. It may therefore enhance the accuracy of the circuit to include synchronization signal means 36 as shown in both FIGURES 5 and 6. The signal may be a 500 mc. sine wave as previously discussed. Althogh an additional synchronization signal may not be required at point S of FIG. 6, such additional means has been shown in phantom and designated 36a. It may be understood that such a synch signal should be in phase with the synch signal impressed at point O to prevent undesirable results, such as phase cancellation or attenuation.

Figure 7:
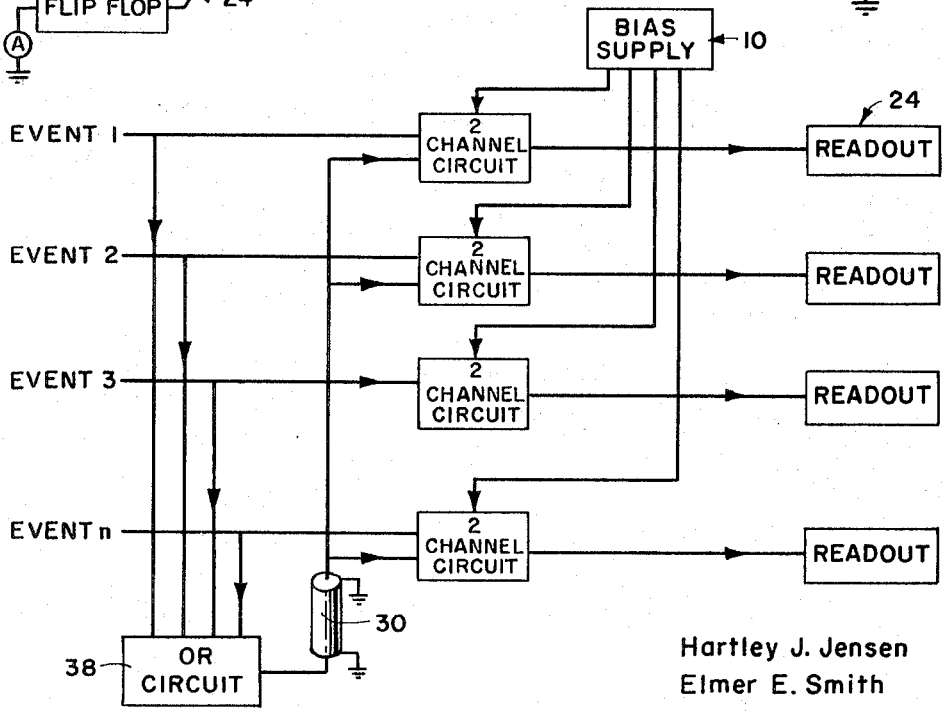
FIG. 7 illustrates another multiple channel embodiment.

In FIG. 7 another form of a multi-channel time interval measurement apparatus is shown. As previously stated, this embodiment may utilize the circuit disclosed in FIG. 5. The input signal from each event may be fed to an OR circuit 38, which may include delay line 30 on the output end of the circuit. The first input to the OR circuit may then become the reference time pulse and it may be fed to the second input channel of each circuit. A variable bias supply 10 may be used, as previously discussed, to bias each tunnel diode to the desired operating point. The time difference between each input pulse and the reference time pulse may be presented by appropriate readout means.

Test results have indicated that the basic storage circuit has an accuracy of about ± one nanosecond, and that resolution of the headout means is about the same, thus giving the apparatus an overall accuracy of ± two nanoseconds. In the dual channel circuit of FIGS. 5, 6, and 7, the accuracy of the apparatus without the synchronization signal degrades to about ± four nanoseconds. The accuracy of the microammeter reading is approximately the same as that of the digital volt-meter reading.

It may thus be seen that the novel time interval measuring apparatus disclosed herein provides a high degree of accuracy for time intervals varying from a nanosecond or less to several milliseconds and it is capable of measuring time intervals between virtually any events capable of being transduced. Moreover, highly desirable attributes of the apparatus, such as its low cost, compactness, and its ability to be expanded in terms of the number of input channels or events capable of being resolved, make it a very flexible device.

We claim:
1. Apparatus for ascertaining the time interval between a plurality of events displaced in time comprising in combination, tunnel diode means for generating a voltage pulse upon being switched from a low state to a high state, means for biasing the diode means to a predetermined operating point, input means to apply to said diode means input pulses spaced in time with respect to each other for switching the diode means from a low state to a high state, electrically short transmission line means connected to the diode means for conducting a pulse generated by the diode means, means associated with the short transmission line means for returning the generated pulse to the diode in reversed polarity for switching the diode from a high state to a low state, electrically long transmission line means connected to the diode means for conducting a pulse generated by the diode means, means associated with the long transmission line means for returning the generated pulse to the diode in the same polarity as it was generated for switching the diode from a low state to a high state, and readout means for ascertaining the length of time the diode means is in a particular state.

2. The combination of claim 1 in which the input means includes an OR circuit and the input pulses are fed to said OR circuit.

3. The combination of claim 1 which includes means for delaying an input pulse.

4. The combination of claim 3 in which the means for delaying an input pulse comprises a transmission line the electrical length of which is equal to the electrical length of the long transmission line.

5. The combination of claim 1 in which the input means includes an OR circuit and the input pulses are fed to said OR circuit and the OR circuit includes means for delaying an output pulse therefrom.

6. The combination of claim 1 in which the means associated with the long transmission line comprises an open end of the transmission line.

7. The combination of claim 1 in which the means associated with the long transmission line comprises a tunnel diode, biasing means, an electrically short transmission line, and means associated with the electrically short transmission line for returning a generated pulse to the diode in reversed polarity.

8. The combination of claim 1 in which the means associated with the short transmission line comprises an impedance lower than that of the said transmission line.

9. The combination of claim 1 in which the input means includes synchronization signal means.

References Cited

UNITED STATES PATENTS

| | | | |
|---|---|---|---|
| 3,061,743 | 10/1962 | Fukui et al. | 307—88.5 |
| 3,062,970 | 11/1962 | Li | 307—88.5 |
| 3,068,405 | 12/1962 | Glazer et al. | 324—68 |
| 3,096,445 | 7/1963 | Herzog | 307—88.5 |
| 3,105,197 | 9/1963 | Aiken | 324—68 |
| 3,122,648 | 2/1964 | Rufer | 307—88.5 |
| 3,138,723 | 6/1964 | Goto | 307—88.5 |

OTHER REFERENCES

Burns-Tunnel Diode-Transistor Monostable Pulse Generator, RCA Technical Note No. 532, March 1962.

RUDOLPH V. ROLINEC, *Primary Examiner.*

S. B. GREEN, P. F. WILLE, *Assistant Examiners.*